United States Patent
Xu

(10) Patent No.: US 11,978,216 B2
(45) Date of Patent: May 7, 2024

(54) PATCH-BASED IMAGE MATTING USING DEEP LEARNING

(71) Applicant: ADOBE INC., San Jose, CA (US)

(72) Inventor: Ning Xu, Milpitas, CA (US)

(73) Assignee: ADOBE INC., San Jose, CA (US)

( * ) Notice: Subject to any disclaimer, the term of this patent is extended or adjusted under 35 U.S.C. 154(b) by 44 days.

(21) Appl. No.: 17/696,377

(22) Filed: Mar. 16, 2022

(65) Prior Publication Data

US 2022/0207751 A1  Jun. 30, 2022

Related U.S. Application Data

(62) Division of application No. 16/847,819, filed on Apr. 14, 2020, now Pat. No. 11,308,628.

(51) Int. Cl.
*G06T 7/11*          (2017.01)
*G06N 3/04*          (2023.01)
(Continued)

(52) U.S. Cl.
CPC ............ *G06T 7/194* (2017.01); *G06N 3/04* (2013.01); *G06N 3/08* (2013.01); *G06T 5/50* (2013.01);
(Continued)

(58) Field of Classification Search
CPC . G06T 7/11; G06T 7/194; G06T 11/60; G06T 2207/20084; G06T 2207/20081; G06T 3/40; G06T 2207/30196; G06T 2210/16; G06T 3/4046; G06T 2207/10024; G06T 2207/20016; G06T 2207/20132; G06T 11/001; G06T 2207/10004;
(Continued)

(56) References Cited

U.S. PATENT DOCUMENTS 9,449,395 B2 *  9/2016  Wang ...................... G06T 7/162
2015/0254868 A1  9/2015  Srikanth et al.
(Continued)

OTHER PUBLICATIONS

Cai, S., Zhang, X., Fan, H., Huang, H., Liu, J., Liu, J., . . . & Sun, J. (2019). Disentangled image matting. In Proceedings of the IEEE International Conference on Computer Vision (pp. 8819-8828).
(Continued)

*Primary Examiner* — Quan M Hua
(74) *Attorney, Agent, or Firm* — Shook, Hardy & Bacon L.L.P.

(57) ABSTRACT

Methods and systems are provided for generating mattes for input images. A neural network system is trained to generate a matte for an input image utilizing contextual information within the image. Patches from the image and a corresponding trimap are extracted, and alpha values for each individual image patch are predicted based on correlations of features in different regions within the image patch. Predicting alpha values for an image patch may also be based on contextual information from other patches extracted from the same image. This contextual information may be determined by determining correlations between features in the query patch and context patches. The predicted alpha values for an image patch form a matte patch, and all matte patches generated for the patches are stitched together to form an overall matte for the input image.

19 Claims, 10 Drawing Sheets

(51) Int. Cl.
*G06N 3/08* (2023.01)
*G06T 5/50* (2006.01)
*G06T 7/194* (2017.01)

(52) U.S. Cl.
CPC .............. *G06T 2207/20081* (2013.01); *G06T 2207/20084* (2013.01); *G06T 2207/20221* (2013.01)

(58) Field of Classification Search
CPC ... G06T 5/50; G06T 7/90; G06T 2207/10016; G06T 2207/20092; G06T 3/4053; G06T 5/004; G06T 5/009; G06T 5/20; G06T 7/12; G06T 7/136; G06T 2207/20221; G06T 2207/20076; G06T 5/008; G06T 9/002; G06N 3/08; G06N 20/00; G06N 3/045; G06N 3/04
See application file for complete search history.

(56) References Cited

U.S. PATENT DOCUMENTS

| | | | | |
|---|---|---|---|---|
| 2016/0163041 | A1* | 6/2016 | Talwar | G06T 7/194 382/128 |
| 2017/0148223 | A1 | 5/2017 | Holzer et al. | |
| 2018/0225827 | A1* | 8/2018 | Aksoy | G06T 7/11 |
| 2019/0236788 | A1 | 8/2019 | Wang et al. | |
| 2020/0311946 | A1* | 10/2020 | Price | G06N 3/045 |
| 2020/0357142 | A1* | 11/2020 | Aydin | H04N 5/275 |

OTHER PUBLICATIONS

Chen, L. C., Papandreou, G., Schroff, F., & Adam, H. (2017). Rethinking atrous convolution for semantic image segmentation. arXiv preprint arXiv: 1706.05587.
Chen, Q., Li, D., & Tang, C. K. (2013). KNN matting. IEEE transactions on pattern analysis and machine intelligence, 35(9), 2175-2188.
Cho, D., Tai, Y. W., & Kweon, I. (Oct. 2016). Natural image matting using deep convolutional neural networks. In European Conference on Computer Vision (pp. 626-643). Springer, Cham.
Deng, J., Dong, W., Socher, R., Li, L. J., Li, K., & Fei-Fei, L. (Jun. 2009). Imagenet: A large-scale hierarchical image database. In 2009 IEEE conference on computer vision and pattern recognition (pp. 248-255). Ieee.
Everingham, M., Eslami, S. A., Van Gool, L., Williams, C. K., Winn, J., & Zisserman, A. (2015). The pascal visual object classes challenge: A retrospective. International journal of computer vision, 111(1), 98-136.
Fu, J., Liu, J., Tian, H., Li, Y., Bao, Y., Fang, Z., & Lu, H. (2019). Dual attention network for scene segmentation. In Proceedings of the IEEE Conference on Computer Vision and Pattern Recognition (pp. 3146-3154).
Gastal, E. S., & Oliveira, M. M. (May 2010). Shared sampling for real-time alpha matting. In Computer Graphics Forum (vol. 29, No. 2, pp. 575-584). Oxford, UK: Blackwell Publishing Ltd.
Grady, L., Schiwietz, T., Aharon, S., & Westermann, R. (Sep. 2005). Random walks for interactive alpha-matting. In Proceedings of VIIP (vol. 2005, pp. 423-429).
He, K., Sun, J., & Tang, X. (Sep. 2010). Guided image filtering. In European conference on computer vision (pp. 1-14). Springer, Berlin, Heidelberg.
He, K., Zhang, X., Ren, S., & Sun, J. (2016). Deep residual learning for image recognition. In Proceedings of the IEEE conference on computer vision and pattern recognition (pp. 770-778).
Hou, Q., & Liu, F. (2019). Context-aware image matting for simultaneous foreground and alpha estimation. In Proceedings of the IEEE International Conference on Computer Vision (pp. 4130-4139).
Huang, Z., Wang, X., Huang, L., Huang, C., Wei, Y., & Liu, W. (2019). Ccnet: Criss-cross attention for semantic segmentation. In Proceedings of the IEEE International Conference on Computer Vision (pp. 603-612).
Kingma, D. P., & Ba, J. (2014). Adam: A method for stochastic optimization. arXiv preprint arXiv:1412.6980.
Levin, A., Lischinski, D., & Weiss, Y. (2007). A closed-form solution to natural image matting. IEEE transactions on pattern analysis and machine intelligence, 30(2), 228-242.
Lin, T. Y., Maire, M., Belongie, S., Hays, J., Perona, P., Ramanan, D., . . . & Zitnick, C. L. (Sep. 2014). Microsoft coco: Common objects in context. In European conference on computer vision (pp. 740-755). Springer, Cham.
Lu, H., Dai, Y., Shen, C., & Xu, S. (2019). Indices matter: Learning to index for deep image matting. In Proceedings of the IEEE International Conference on Computer Vision (pp. 3266-3275).
Lutz, S., Amplianitis, K., & Smolic, A. (2018). Alphagan: Generative adversarial networks for natural image matting. arXiv preprint arXiv:1807.10088.
Na, S., Lee, S., Kim, J., & Kim, G. (2017). A read-write memory network for movie story understanding. In Proceedings of the IEEE International Conference on Computer Vision (pp. 677-685).
Oh, S. W., Lee, J. Y., Xu, N., & Kim, S. J. (2019). Video object segmentation using space-time memory networks. In Proceedings of the IEEE International Conference on Computer Vision (pp. 9226-9235).
Paszke, A., Gross, S., Chintala, S., Chanan, G., Yang, E., DeVito, Z., . . . & Lerer, A. (2017). Automatic differentiation in pytorch.
Rhemann, C., Rother, C., Wang, J., Gelautz, M., Kohli, P., & Rott, P. (Jun. 2009). A perceptually motivated online benchmark for image matting. In 2009 IEEE Conference on Computer Vision and Pattern Recognition (pp. 1826-1833). IEEE.
Shen, X., Tao, X., Gao, H., Zhou, C., & Jia, J. (Oct. 2016). Deep automatic portrait matting. In European conference on computer vision (pp. 92-107). Springer, Cham.
Sun, J., Jia, J., Tang, C. K., & Shum, H. Y. (2004). Poisson matting. In ACM SIGGRAPH 2004 Papers (pp. 315-321).
Vaswani, A., Shazeer, N., Parmar, N., Uszkoreit, J., Jones, L., Gomez, A. N., . . . & Polosukhin, I. (2017). Attention is all you need. In Advances in neural information processing systems (pp. 5998-6008).
Wang, J., & Cohen, M. F. (Jun. 2007). Optimized color sampling for robust matting. In 2007 IEEE Conference on Computer Vision and Pattern Recognition (pp. 1-8). IEEE.
Wang, X., Girshick, R., Gupta, A., & He, K. (2018). Non-local neural networks. In Proceedings of the IEEE conference on computer vision and pattern recognition (pp. 7794-7803).
Xu, N., Price, B., Cohen, S., & Huang, T. (2017). Deep image matting. In Proceedings of the IEEE Conference on Computer Vision and Pattern Recognition (pp. 2970-2979).
Yang, T., & Chan, A. B. (2018). Learning dynamic memory networks for object tracking. In Proceedings of the European Conference on Computer Vision (ECCV) (pp. 152-167).

* cited by examiner

PATCH-BASED IMAGE MATTING USING DEEP LEARNING

CROSS-REFERENCE TO RELATED APPLICATIONS

This application is a divisional of U.S. patent application Ser. No. 16/874,819 filed Apr. 14, 2020, the entire contents of which are incorporated by reference herein.

BACKGROUND

In image and video editing and composition, users often desire to extract an object (i.e., the foreground) from the background of an image. Matting is the process used to separate a foreground object from the background. A matte presents alpha values for each pixel to indicate which pixels have foreground information and which pixels have background information. Some pixels, particularly those around edges of objects and in regions corresponding to hair, glass, and motion blur, can have a combination of both foreground and background information.

Because determining alpha values for each pixel can be time consuming, trimaps are typically used to reduce the number of pixels for which an alpha value is determined. Generally, a trimap indicates regions of the image that are known foreground, known background, and unknown combinations of foreground and background colors. Accordingly, only alpha values in the regions of unknown combinations may be determined, conserving time and processing power. Even with trimaps, however, determining accurate alpha values can be difficult, particularly for high resolution images. Utilizing deep learning methods to estimate alpha values are generally considered to yield more accurate image matting than non-deep learning methods, such as sampling-based methods and propagation-based methods. However, with existing deep learning methods, there is often a tradeoff between accuracy and resource consumption. For instance, in image-based deep learning methods, hardware limitations require high resolution images to be down-sampled before generating the alpha matte, resulting in the loss of fine details. Additionally, in conventional patch-based deep learning methods, a high resolution image is divided into patches, where matting occurs on individual patches before being stitched back together. Because estimations are limited to information within each patch, the results of existing patch-based deep learning methods are not always reliable, particularly where a patch's trimap contains relatively few foreground and/or background pixels.

SUMMARY

Embodiments of the present invention are directed towards a system trained to generate a matte of an image that accurately reflects the foreground and background color information of pixels in the image. In embodiments of the present disclosure, such a system includes a neural network system trained to generate a matte for an image utilizing contextual information within the image. Generating the matte for an image includes extracting patches from the image and a trimap corresponding to the image. Alpha values for an image patch are predicted based on correlations determined between features in different regions within the image patch. For instance, correlations between unknown and foreground regions, unknown and background regions, unknown and unknown regions, as indicated by the corresponding trimap patch, are determined utilizing the neural network system. In some embodiments, generating the matte further includes utilizing contextual information from other patches extracted from the same image. As such, for each image patch, a subset of other image patches may be selected to provide contextual information, and correlations between features in the image patch and the context image patches may be used to predict alpha values. The predicted alpha values for pixels within an image patch form a matte patch defining foreground and background regions within the image patch.

This process is performed for all image patches extracted from an image to generate a plurality of matte patches. The matte patches are stitched together to form a matte for the entire image. The generated matte may be utilized to extract a foreground object from the input image, which may then be combined with a different background.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
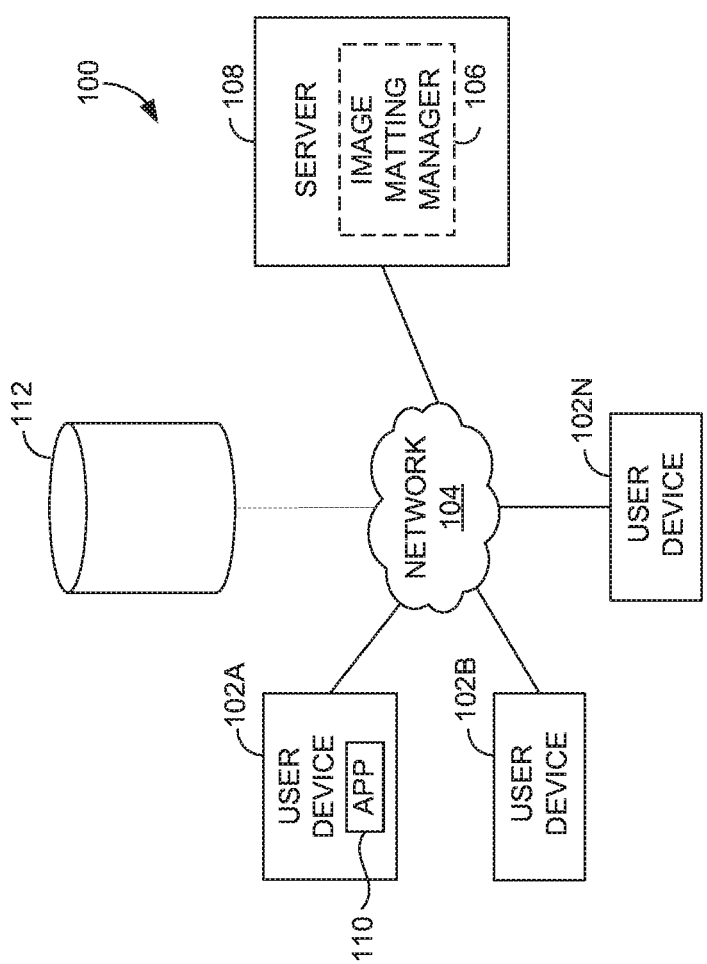
FIG. 1 depicts an example configuration of an operating environment in which implementations of the present disclosure can be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

DEFINITIONS

Various terms are used throughout this description. Definitions of some terms are included below to provide a clearer understanding of the ideas disclosed herein:

The term "image" is used herein to refer to data captured from a camera. Images may comprise frames from video files or video feeds or one or more photographs, including LDR and HDR image files. Images may comprise data captured by a camera and displayed on a user device in real time even if the data is not stored. The term "high resolution image" is used herein to refer to images that are equal to or larger than 4000×4000.

The term "trimap" is used herein to refer to data providing course background and foreground color information for an image. Specifically, a trimap indicates regions of the image that are pure foreground, pure background, and unknown combinations of blended foreground and background colors. As such, a trimap may be considered a pre-segmented image. Trimaps can be generated by a user selecting unknown regions of a training image or may be automatically generated using an algorithm.

The term "matte" (also referred to as an image matte or an alpha matte) is used herein to refer to an image layer indicating the alpha values for each pixel within an image. An alpha value is a measurement of opacity and indicates a percentage of foreground color, relative to background color, that exists in association with the corresponding pixel.

The term "patch" is used herein to refer to a portion of a larger image or layer. For example, an image patch refers to a portion of image, a trimap patch refers to a portion of a trimap, and a matte patch refers to a portion of a matte. As detailed further herein, some patches may be extracted from the larger object, such as an image patch and a trimap patch, while other patches may be utilized to collectively form the larger object, such as a matte patch.

OVERVIEW

Embodiments of the present disclosure are directed towards generating a matte of an image, which may be used in extracting an object from the image. In image and video editing and composition, users often desire to extract an object (i.e., the foreground) from the background of an image. Manually removing an object pixel-by-pixel is time consuming and may be imprecise, particularly where edges of an object do not align with edges of a pixel. To reduce the amount of time to remove an object from an image and to take into account pixels with both foreground and background information, matting can be used to perform object extraction.

Matting (also referred to herein as image matting) is the process used to separate a foreground object from the background of an image. Generally, each pixel within an image includes color values (e.g., RGB values) and an alpha value indicating an amount of opacity. A matte (sometimes referred to as an alpha matte) generally includes the alpha values for each pixel within an image. Opacity determines how much background or foreground color exists in a pixel, where higher opacity (e.g., higher alpha value) indicates more foreground color. As such, an alpha matte generally indicates a percentage of foreground color that exists in association with the corresponding pixel. In this way, in matting, an object is separated from a background in an image by categorizing each pixel of the image as foreground, background, or as containing both foreground and background information. Typically, pixels around the edge of objects and pixels in regions corresponding with hair, glass, and motion blur tend to have a combination of foreground and background color.

Determining alpha values for the pixels in an image is a difficult and time-consuming task that is based on an underconstrained equation. As such, trimaps are typically used to reduce the number of pixels for which an alpha value is determined. Generally, a trimap indicates regions of the image that are pure foreground, pure background, and unknown combinations of blended foreground and background colors. Accordingly, only alpha values in the regions of unknown color combinations may be determined, conserving time and processing power. Upon determining alpha values for the unknown regions of an image, a matte can depict, for example, pure foreground as a white pixel, pure background as a black pixel, and pixels comprised of both foreground and background as an appropriate shade of grey based on the percentage of foreground versus background.

Even with trimaps, however, generating accurate alpha values can be difficult, particularly for high resolution images. Utilizing deep learning methods to estimate alpha values is generally considered to yield more accurate matting results compared to non-deep learning methods, such as sampling-based methods and propagation-based methods. However, with existing deep learning methods, there is often a tradeoff between accuracy and resource consumption, particularly with high resolution images. For instance, in image-based deep learning methods, hardware limitations requires high resolution images to be downsampled before generating the matte, resulting in the loss of fine details. In conventional patch-based deep learning methods, a high resolution image is divided into patches, where matting occurs on individual patches before being stitched back together. Because estimations are limited to information within each patch, the results of existing patch-based deep learning methods are not always reliable, particularly where a patch's trimap contains relatively few foreground and background pixels.

Accordingly, embodiments of the present invention are directed to facilitating efficient and effective image matting, particularly of high resolution images, using contextual information from within an image patch and across multiple image patches. In this regard, a matte for an image provided by a user can be generated that accurately reflects foreground/background combination regions. Such a matte can be used to more precisely extract an object from an image even for images with very detailed or highly blended regions, such as images with hair, glass, or motion blur in the foreground.

At a high-level, a neural network system is utilized to generate accurate mattes by capturing contextual information using one or more attention mechanisms. In particular, an image is divided into patches, and alpha values are predicted for each pixel within a patch based on contextual information from other regions within the patch and, in some embodiments, contextual information from other patches extracted from the same image. Mattes generated for each patch may then be combined, such as by stitching, to create an overall matte for the input image. In exemplary embodiments, the generated matte is utilized to extract a foreground object from the input image, which may then be combined with a different background.

Generating the matte for an image includes extracting patches from the image and a trimap corresponding to the image. Alpha values for an image patch are predicted based on correlations determined between features in different regions within the image patch. For instance, correlations between unknown and foreground regions, unknown and background regions, unknown and unknown regions, as indicated by the corresponding trimap patch, are determined utilizing the neural network system. Further, feature maps generated from the determined correlations are utilized to predict alpha values within the image patch. In this way, operations performed to predict alpha values are not localized to a particular region but, rather, utilize contextual information from other regions within the patch.

In some embodiments, generating the matte further includes determining correlations between different patches. As such, for each patch, a subset of other patches may be identified to provide contextual information. In other words, when predicting alpha values for pixels within a query image patch, information from context image patches extracted from the same image may be used. This process includes determining value features and key features for the query image patch and the context image patches, where key features are computed to determine where to retrieve relevant value features. Feature maps generated from this cross-patch information as well as contextual information within the query patch are utilized to predict alpha values for the query patch.

The predicted alpha values for pixels within an image patch form a matte defining foreground and background regions within the image patch. A matte generated for a particular image patch is referred to herein as a matte patch. This process is performed for all image patches extracted from an image to generate a plurality of matte patches. The matte patches may then be stitched together to form a matte for the entire image. By leveraging this contextual information within a patch and, in some aspects, across other patches, embodiments of the disclosure can more accurately predict alpha values and yield more precise extraction and composition functions compared to conventional systems that either require downsampling of input images due to hardware limitations or utilize patches without considering contextual information.

EXEMPLARY IMAGE MATTING SYSTEM

FIG. 1 depicts an example configuration of an environment in which some implementations of the present disclosure can be employed to generate a matte for an input image. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that environment 100 shown in FIG. 1 is an example of one suitable operating environment. Among other components not shown, environment 100 includes a number of user devices, such as user devices 102a and 102b through 102n, network 104, database 112, and server(s) 108. Each of the components shown in FIG. 1 may be implemented via any type of computing device, such as one or more of computing device 1100 described in connection to FIG. 11, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102a through 102n may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for generating a matte. In some implementations, application 110 comprises a web application that can run in a web browser and could be hosted at least partially on the server-side of environment 100. In addition, or instead, application 110 may comprise a dedicated application, such as an application having image processing functionality. For example, application 110 may be an application that provides for image editing, such as the Adobe® Photoshop®. In some cases, application 110 is integrated into the operating system (e.g., as a service). It is, therefore, contemplated herein that "application" be interpreted broadly.

In accordance with embodiments herein, the application 110 can facilitate generating a matte for an image. In particular, a user can select or input an image or picture for which a matte is to be created. An image and/or picture can be selected or input in any manner. For example, a user may take a picture using a camera on a device, for example, user device 102a. As another example, a user may select a desired image from a repository, for example, stored in a data store accessible by a network, such as database 112, or stored locally at the user device 102a. Embodiments of application 100 may further facilitate extracting an object from the input image using the generated matte. In addition, a user can select, for example, a new background for the extracted object. In this regard, the composite image of the extracted object on the new background can be displayed via a display screen of the user device.

As described herein, server 108 can facilitate generating a matte via image matting manager 106. Server 108 includes one or more processors, and one or more computer-storage media. The computer-storage media includes computer-readable instructions executable by the one or more processors. The instructions may optionally implement one or more components of image matting manager 106, described in additional detail below. Image matting manager 106 trains and operates a neural network system to generate a matte for an input image. The neural network system trained and operated by the image matting manager 106 may be comprised of one or more neural networks trained to generate designated output.

At a high level, image matting manager 106 trains a neural network system to estimate alpha values for pixels in input image data and generate a matte reflecting the alpha values. The input data includes an image, such as a high resolution image, and a trimap for that image to constrain the area of the image for which pixel foreground/background composition needs to be determined. The image and corresponding trimap are both divided into patches, and utilizing designations of the trimap patch as foreground, background, or unknown combinations of foreground and background, the neural network system analyzes the pixels in each image patch to predict a likely alpha value for each pixel, which is utilized to generate a matte for the image. Generating the matte includes determining correlations between features in different regions within the image patch, including the background, foreground, and unknown regions as indicated by the corresponding trimap patch. Additionally, correlations between features in the image patch and other patches from the same input image may be determined and utilized to predict alpha values. The mattes generated for each patch are stitched together to create a matte for the entire image.

Prior to generating mattes for new images, the neural network system is trained using input images, referred to herein as training images. Each training image is input into the network with a training trimap associated with the training image, and a matte, referred to as a training matte, is generated. The generated training mattes are compared to a reference matte, also referred to as the ground truth, to facilitate training of the matting neural network. In this regard, the neural network can be modified or adjusted based on the comparison such that the quality of subsequently generated mattes increases. One way in which quality can be determined is based on accuracy of the predicted alpha values for each pixel that comprise the generated matte.

For cloud-based implementations, the instructions on server 108 may implement one or more components of image matting manager 106, and application 110 may be utilized by a user to interface with the functionality implemented on server(s) 108. In some cases, application 110 comprises a web browser. In other cases, server 108 may not be required. For example, the components of image matting manager 106 may be implemented completely on a user device, such as user device 102a. In this case, image matting manager 106 may be embodied at least partially by the instructions corresponding to application 110 and may be provided as an add-on or plug-in to application 110. Thus, it should be appreciated that image matting manager 106 may be provided via multiple devices arranged in a distributed environment that collectively provide the functionality described herein. Additionally, other components not shown may also be included within the distributed environment. In addition, or alternatively, image matting manager 106 may be integrated, at least partially, into a user device, such as user device 102a. Furthermore, image matting manager 106 may at least partially be embodied as a cloud computing service.

Environment 100 of FIG. 1 further may include database 112, which may store computer instructions (e.g., software program instructions, routines, or services), data, and/or models used in embodiments described herein. In some implementations, database 112 stores information or data received via the various components of image matting manager 106 and provides the various components with access to that information or data as needed. Although depicted as a single component, database 112 may be embodied as one or more data stores. Further, the information in database 112 may be distributed in any suitable manner across one or more data stores for storage (which may be hosted externally or internally).

Figure 2:
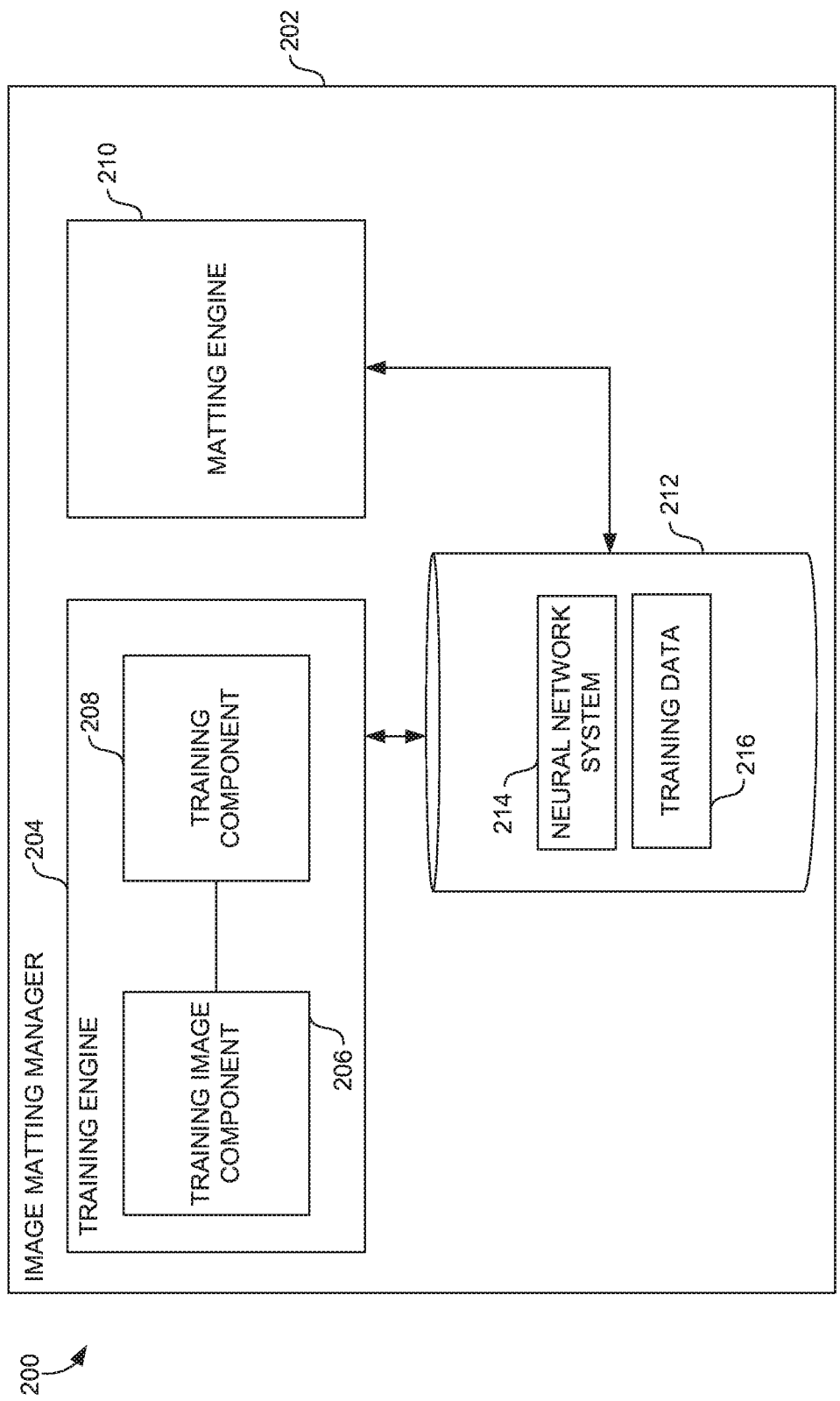
FIG. 2 depicts aspects of an example image matting system, in accordance with various embodiments of the present disclosure.

Referring to FIG. 2, aspects of an illustrative image matting system 200 are shown, in accordance with various embodiments of the present disclosure. Image matting manager 202 includes training engine 204, matting engine 210, and data store 212. The foregoing components of image matting manager 202 can be implemented, for example, in operating environment 100 of FIG. 1. In particular, those components may be integrated into any suitable combination of user devices 102a and 102b through 102n, and server(s) 208, including as image matting manager 106 of FIG. 1.

Data store 212 is used to store computer instructions (e.g., software program instructions, routines, or services), data, and/or models used in embodiments described herein. In some implementations, data store 212 stores information or data received via the various components of image matting manager 202 and provides the various components with access to that information or data, as needed. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes training data 216. Training data generally refers to data used to train a neural network, or portion thereof. As such, training data 216 can include reference mattes, training images, training mattes, and/or training trimaps. In some cases, data can be received by image matting manager 202 from user devices (e.g., an input image/trimap received by user device 102a or another device associated with a user, via, application 110). In other cases, data can be received from one or more data stores in the cloud. Data store 212 can also be used to store the neural network system 214.

Training engine 204 is used to train neural network system 214 that is used to create mattes for input images. In embodiments, the mattes generated from the neural network system 214 are used to extract foreground objects, which can then be manipulated to create composite images. As depicted in FIG. 2, training engine 204 includes a training image component 206 and a training component 208. Although these components are illustrated separately, it can be appreciated that the functionality described in association therewith can be performed by any number of components.

Training image component 206 provides training images that are to be fed into the neural network system 214 for training purposes. The training input images comprise images that include foreground objects and background regions. In some embodiments, the training input images are synthetic composite images that are created with extracted foreground objects and background images. Training image component 206 may generate the synthetic composite images or receive them from a data store, such as data store 212. The input images may be obtained from various sources, including frames selected from a video. Input images may contain different types of objects and different background scenes as well as different textual details, colors, and patterns.

Training image component 206 is also used to provide training trimaps. Each training input image will have a corresponding training trimap indicating regions of pure foreground, pure background, and unknown regions within the training input image. Trimaps can be generated by a user selecting unknown regions of a training image. For example, a user can trace, outline, or otherwise select portions of a training image and indicate whether a traced and/or outlined portion is known foreground, known background, or an unknown region. Alternatively, trimaps can be generated automatically using an algorithm.

Training image component 206 can also be used to implement augmentation methods to further enlarge the dataset for training a neural network system. Training images can be augmented in any number of ways to expand the data set of training images (and corresponding trimaps), resulting in a more finely tuned system for generating mattes from input images. Such an augmented dataset can be stored, for example, as training data 216 in data store 212.

Training component 208 uses input images and trimaps from training image component 206 for training the neural network system 214. From an input image and corresponding trimap, the neural network system predicts alpha values for each pixel of the training image, and a matte indicating the alpha values is generated. Predicting alpha values may be performed in a crop-and-stitch manner such that a training image and corresponding training trimap are cropped into patches for generating matte patches that are then stitched together to create a training matte for the entire training image. Additionally, in predicting alpha values for each pixel, contextual information from other pixels is utilized. For example, as explained further with respect to FIG. 3, a within-patch attention mechanism is utilized in which non-local operations are performed to predict alpha values for pixels within a patch based on pixels in other regions within the patch. Additionally, in some embodiments, alpha values for pixels within a particular patch are also based on information in other patches taken from the same training input image as described further with respect to FIG. 5.

Training matte patches representing predicted alpha values are stitched together to generate a training matte for the training input image. The training matte output from the neural network system 214 is compared to a reference (or ground truth) matte associated with the training input image to determine errors between the output training matte and the reference matte. The errors are used to adjust the neural network system 214 to avoid similar errors in future iterations. A process of training a neural network system, such as neural network system 214, is discussed further with respect to FIG. 9.

In execution, the neural network system 214, trained according to the present disclosure, is used to generate mattes based on predicted alpha values for input images. In some embodiments, the neural network system 214 may further be utilized to extract foreground objects from input images using the generated mattes. Such matting and object extraction can be performed by matting engine 210 utilizing the neural network system 214. The method of creating mattes is similar to the process described for training the neural network system 214 in that alpha values for the input image are predicted by the trained neural network system 214; however, in execution, input images are typically not associated with existing reference mattes.

An image for use by the matting engine 210 is received from a user at a user device. In particular, a user can select or input an image or picture from which an object is to be extracted using a matte. Such an image can include a picture taken by a user using a computing device such as those described with reference to FIG. 10. An image and/or picture can be selected or input in any manner. For example, a user may take a picture using a camera on a device, for example, user device 102a of FIG. 1. As another example, a user may select a desired image from storage, such as database 112, accessible by a network or stored locally at the user device 102a of FIG. 1. In other aspects, a user inputs an image by inputting a link or URL to an image. In addition to the input image, an associated trimap can be input. Such a trimap can be input manually by a user or utilizing an algorithm without user input defining the different regions. Based on the input image and an associated trimap, a matte for the input image can be generated by the matting engine 210. Such a trained neural network system 214 is capable of generating a matte for images that have associated trimaps where all or the majority of the pixels are designated as a mix of foreground and background.

In some embodiments, after the neural network system 214 generates a matte based on an input image and an associated trimap, matting engine 210 further extracts a foreground object from the input image using the generated matte. The extracted foreground object can be provided to a user via a user device, for example, user device 102a. In addition, the matting engine 210 may generate a composite image using such an extracted foreground object and a new background image. A user can select a new background, and the extracted foreground object can be combined with the new background. For example, a glass of water extracted from a restaurant scene background using a matte may be placed into a pool scene background. The composite image of the extracted foreground object on the new background can be displayed via a display screen of a user device, such as user device 102a.

GENERATING A MATTE FOR AN IMAGE

Figure 3:
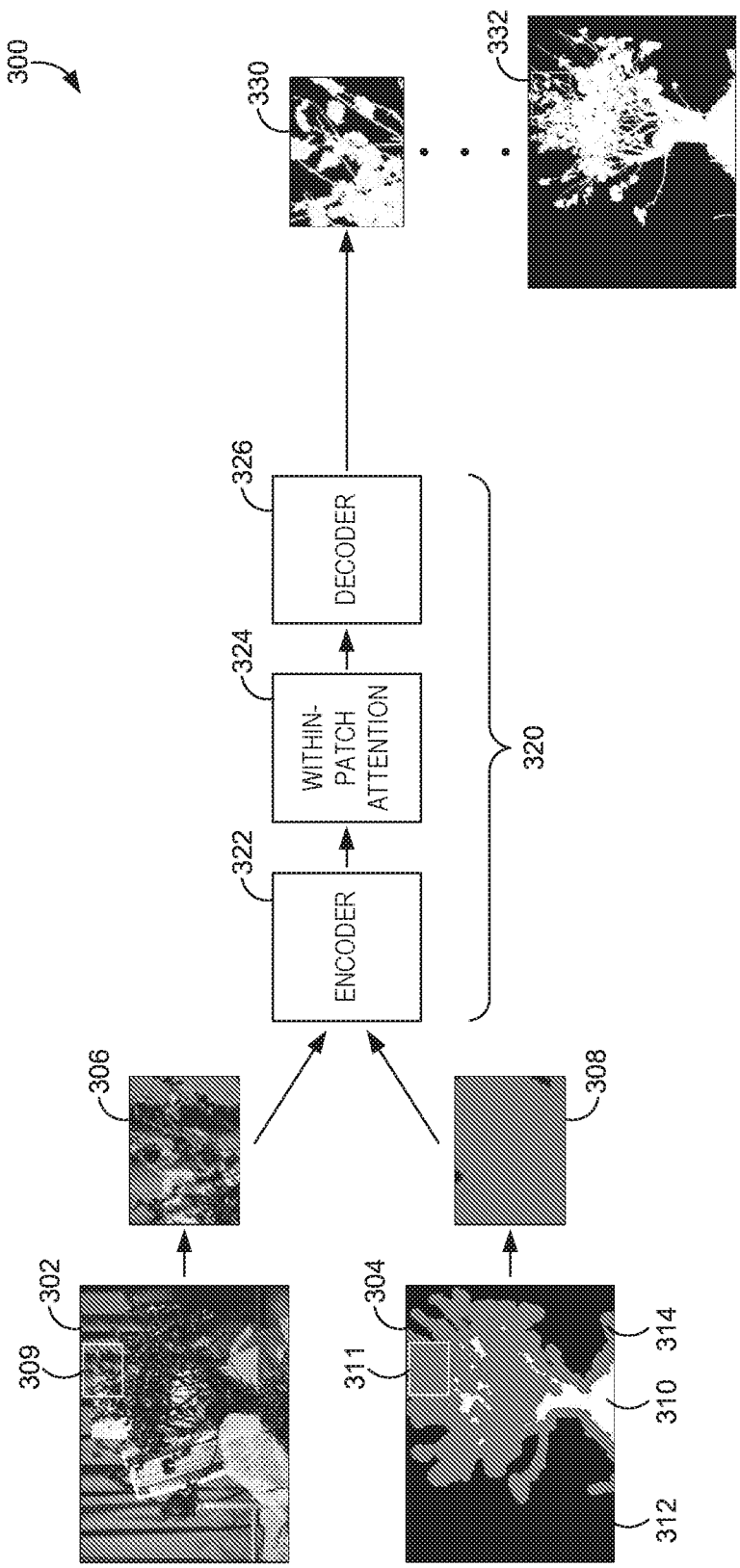
FIG. 3 illustrates a process flow showing an embodiment for generating mattes for input images utilizing within-patch attention, in accordance with embodiments of the present invention.

FIG. 3 depicts an example process 300 of generating image mattes in accordance with embodiments of the disclosure. Process 300 may be performed by a matting engine, such as matting engine 210, utilizing a trained neural network, such as neural network 214. An image 302 and corresponding trimap 304 are received. Image 302 may be received from a user at a user device. In particular, a user can select or input an image or picture for the image 302. Image 302 may be selected or input in any manner. For example, a user may take a picture using a camera on a device, such as user device 102a of FIG. 1, to use as image 302. As another example, a user may select a desired image from a repository, for example, stored in a data store, such as database 112, accessible by a network or stored locally at the user device. In other embodiments, a user can select image 302 by inputting a link or URL to an image.

Trimap 304 corresponds to image 302 in that trimap 304 indicates foreground and background information for image 302. For example, trimap 304 indicates regions of pure foreground (e.g., white region 310), regions of pure background (e.g., black region 312), and unknown regions (e.g., gray region 314) with unknown foreground and background information that are potentially a blend of both foreground and background within image 302. In some embodiments, trimap 304 is created by a user manually selecting and identifying different regions of image 302. Alternatively, trimap 304 may be generated automatically using an algorithm without user input.

As depicted, patches are extracted from image 302 and trimap 304. For instance, an image patch 306 is extracted from image 302 and a trimap patch 308 is extracted from trimap 304. Image patch 306 is part of image 302, and trimap patch 308 is part of trimap 304. Boxes 309 and 311 indicate from where image patch 306 and trimap patch 308, respectively, are extracted. As illustrated, image patch 306 and trimap patch 308 are extracted from corresponding regions such that trimap patch 308 indicates the regions of image patch 306. In this example, trimap patch 308 only includes background and unknown regions.

For clarity, process 300 of FIG. 3 depicts only one image patch/trimap patch pair, but it is understood that multiple patches are extracted from image 302 and trimap 304 to generate a matte. For instance, the entire image and trimap may be cropped into patches where a matte patch is generated from each image patch/trimap patch pair. In some embodiments, the size of each patch (also referred to as the crop size) is the same for all patches extracted from a particular image. In some embodiments, the crop size is between 320×320 to 1000×1000. For example, the crop size may be one of 320×320, 480×480, 640×640, and 1000×1000. In some embodiments, patches of different sizes may be extracted from the same image. For example, in some instances, neural network system 320 comprise a multiscale neural network in which patches are extracted from input image 302 using three crop sizes, such as 320×320, 480×480, and 640×640. Further, in example embodiments, patches extracted from image 302 and trimap 304 have overlap with neighboring patches. In alternative embodiments, there is no overlap between patches.

Image patch 306 and trimap patch 308 are fed into neural network system 320, which may be an embodiment of neural network system 214 of FIG. 2. Image patch 306 and trimap patch 308 may be concatenated as they are input into neural network system 320. Some embodiments of neural network system 320 includes one or more residual neural networks. Neural network system 320 includes encoder 322, within-patch attention module 324, and decoder 326. Encoder 322 forms a first subset of layers within neural network system 320 and is generally responsible for transforming image patch 306 into feature maps. These feature maps may further include trimap information from the corresponding trimap patch 308. In some embodiments, encoder 322 comprises convolutional layers applying 3×3 filters.

Feature maps output from encoder 322 are input into within-patch attention module 324, which is generally responsible for applying within-patch attention. As used herein, within-patch attention comprises a mechanism to construct correlations between features in different regions within a given image patch. For instance, in exemplary embodiments, within-patch attention module 324 correlates features between unknown and foreground regions, unknown and background regions, and unknown and unknown regions within image patch 306. In this way, operations performed to predict alpha values are not localized to a particular region but, rather, are non-local operations utilizing contextual information from other regions within image patch 306. By performing non-local operations, dependency between these region pairs is explicitly constructed.

Mathematically, given feature map X (from encoder 322) and trimap T, within-patch attention between unknown and foreground regions may be defined as:

$$y_i = \frac{1}{Z}\sum_j f(x_{UN,i}, x_{FG,j})g(x_{FG,j})$$

$$f(x_{UN,i}, x_{FG,j}) = \theta(x_{UN,i})^T \emptyset(x_{FG,j})$$

where i is a pixel within the unknown region and j is a pixel within the foreground region and where $x_{UN}$, $x_{BG}$ is a masked feature map for unknown and foreground regions, respectively, which are defined as:

$$x_{un} = x \odot \mathbb{1}_{T=128} \text{ and } x_{FG} = x \odot \mathbb{1}_{T=255}$$

where $\odot$ is element-wise multiplication.

Within-patch attention for unknown-background and unknown-unknown region pairs is defined similarly. For instance, within-patch attention between unknown and background regions may be defined as:

$$y_i = \frac{1}{Z}\sum_j f(x_{UN,i}, x_{BG,j})g(x_{BG,j})$$

$$f(x_{UN,i}, x_{BG,j}) = \theta(x_{UN,i})^T \emptyset(x_{BG,j})$$

where $x_{UN}$, $x_{BG}$ is a masked feature map for unknown and background regions, respectively, which are defined as:

$$x_{un} = x \odot \mathbb{1}_{T=0} \text{ and } x \odot \mathbb{1}_{T=255}$$

Within-patch attention between unknown and unknown regions may be defined as:

$$y_i = \tfrac{1}{Z}\Sigma f(x_{UN,i}, x_{UN,j})g(x_{UN,j})$$

$$f(x_{UN,i}, x_{UN,j}) = \theta(x_{UN,i})^T \emptyset(x_{UN,j})$$

where $x_{UN}$, $x_{UN}$ is a masked feature map for unknown and background regions, respectively, which are defined as:

$$x_{UN} = x \odot \mathbb{1}_{T=0} \text{ and } x_{UN} = x \odot \mathbb{1}_{T=255}$$

Figure 4:
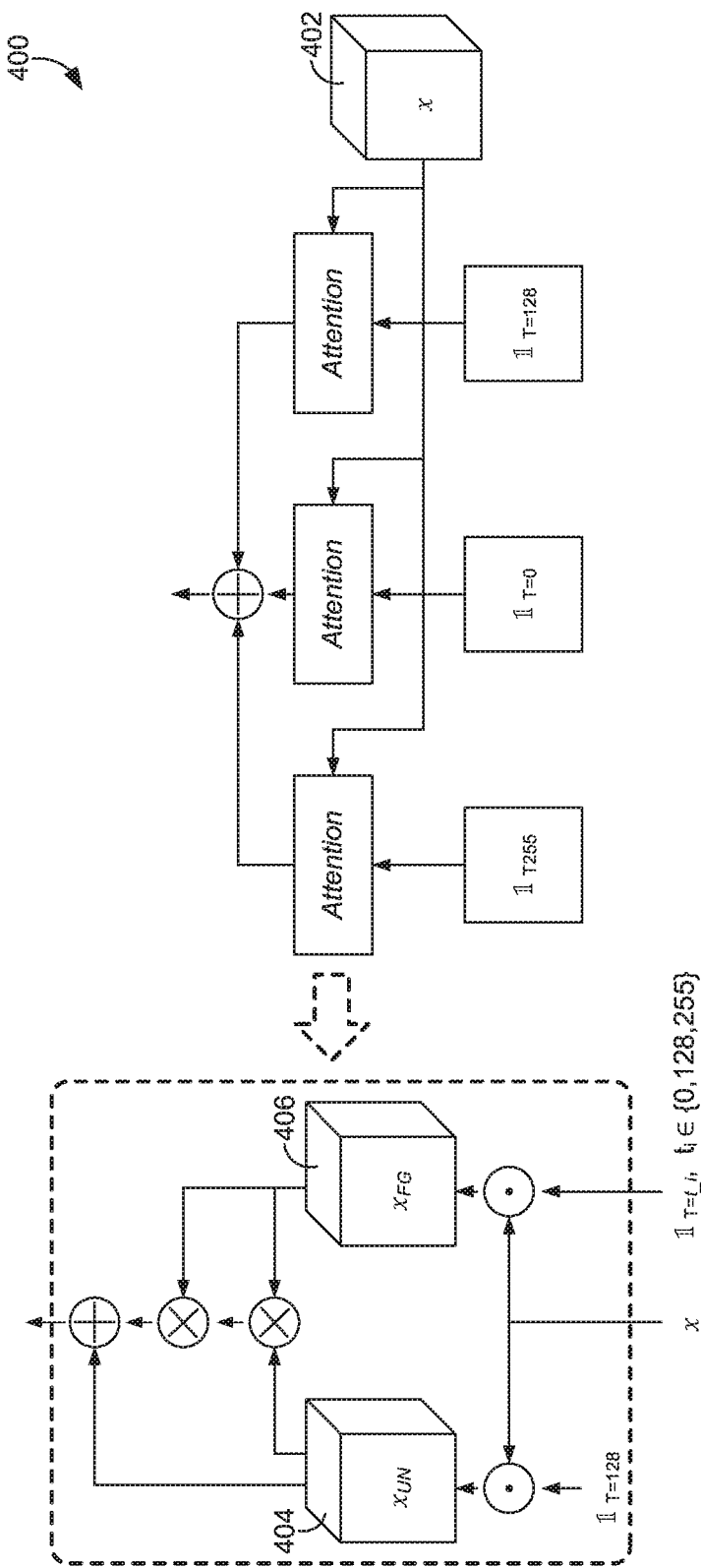
FIG. 4 illustrates an example pipeline for within-patch attention, in accordance with embodiments of the present disclosure.

FIG. 4 depicts an example pipeline 400 for within-patch attention module 324 for an unknown region and a foreground region. As illustrated, feature map 402 is multiplied with unknown-region indicator $\mathbb{1}_{T=128}$, which yields masked unknown feature map 404. Similarly, feature map 402 is multiplied with foreground region indicator $\mathbb{1}_{T=255}$ to yield masked foreground feature map 406.

Returning to FIG. 3, masked feature maps generated using within-patch attention module 324 are then fed through decoder 326, representing a final subset of layers in neural network system 320. In some embodiments, decoder 326 includes convolutional layers and upsampling (e.g., unpooling and bilinear upsampling) layers. Within this subset of layers represented by decoder 326 is an alpha prediction layer that predicts alpha values for each pixel within image patch 306. As previously explained, alpha values indicate a measure of the amount of foreground color relative to the amount of background color in an image. In example embodiments, alpha values range from 0 to 1 indicating a percentage of foreground color that exists at each pixel. An alpha value of 0 indicates no foreground color, such that the color information for the pixel is purely from the background, and conversely, an alpha value of 1 indicates all foreground color such that the color information is purely from the foreground. In this way, alpha values can also be considered as indicating a degree of opacity of the foreground color.

Alpha values for all pixels within image patch 304 are combined to generate a matte patch 330 that is output from neural network system 320. Matte patch 330 corresponds to image patch 306 in that it indicates background and foreground information for image patch 306. In this embodiment, regions of black within the matte patch 330 indicate background pixels, and regions of white indicate foreground pixels.

This process of generating matte patches utilizing neural network 320 based on within-patch attention mechanisms is performed for all patches taken from image 302 such that alpha values for the entire image 302 are predicted. As such, a plurality of matte patches are generated. These matte patches are stitched together to create an overall matte 332 for the entire image 302.

As previously stated, in some embodiments, there is overlap between adjacent neighboring patches extracted from the same image. Having overlap increases the accuracy of alpha values along boundaries between patches when matte patches are stitched together. As such, in some embodiments, generating matte 332 from the plurality of matte patches includes determining alpha values for the pixels in overlapping regions. In some embodiments, the alpha value for a pixel in an overlapping region is a weighted sum of the alpha values of pixels from the overlapping patches. Weights in the overlapping region may be negatively proportional to the distance from the nearest non-overlapping neighbor, while weights in a non-overlapping region may always be 1. For instance, a distance matric (D) is mapped and normalized to obtain weight mask M' with the following:

$$M' = -\frac{D}{\text{Max}(D)} + 1$$

where $D_{x,y}$ is the Euclidean distance of coordinate (x,y) from a pixel's nearest neighbor in a non-overlapping region. Finally, the weight for each pixel in a particular matte patch, such as matte patch 330, is normalized by the corresponding weights from two or four neighboring patches as by:

$$M_{x,y} = \begin{cases} 1 & \text{if } (x, y) \text{ in non-overlapping region} \\ \dfrac{M'_{x,y}}{\sum_{i=1}^{N} M'_{\hat{x},\hat{y}}} & \text{if } (x, y) \text{ in overlapping region} \end{cases}$$

In addition to context from within a patch, some embodiments of the disclosure predict alpha values by leveraging context from other patches. For each patch for which alpha values are predicted, a number of additional patches may be selected and utilized to provide this context for predicting alpha values. As used herein, "query patch" refers to the patch for which alpha values are predicted, and "context patch" refers to another patch from the same image that is used to predict alpha values for the query patch.

Figure 5:
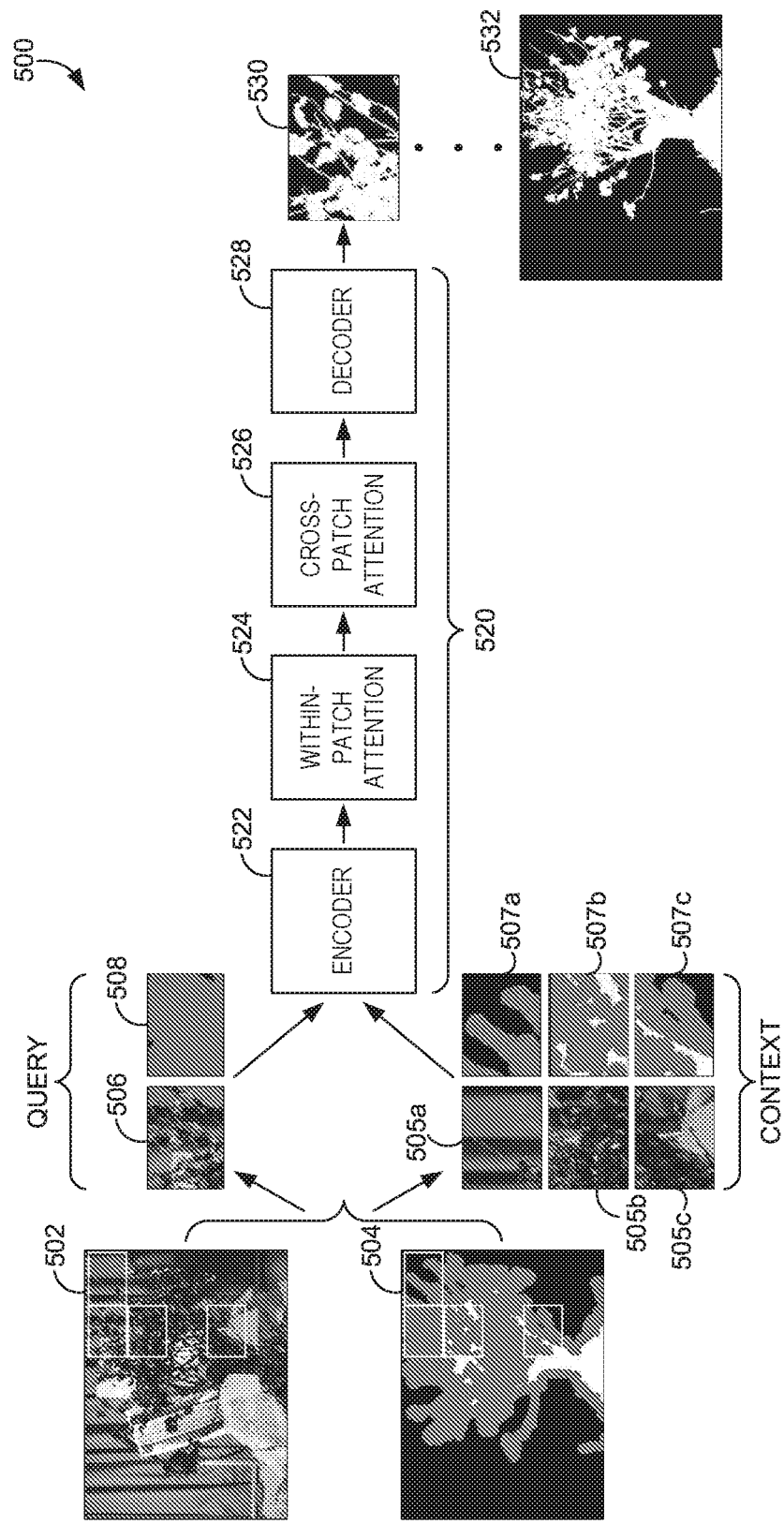
FIG. 5 illustrates a process flow showing an embodiment for generating mattes for input images utilizing within-patch attention and cross-patch attention, in accordance with embodiments of the present invention.

FIG. 5 depicts an example process 500 of generating image mattes in accordance with embodiments of the disclosure. Process 500 may be performed by a matting engine, such as matting engine 210 in FIG. 2, utilizing a trained neural network, such as neural network 214. An image 502 and corresponding trimap 504 are received, and patches are extracted. For instance, image patch 506 is extracted from image 502, and trimap patch 508 is extracted from trimap 504. The operations of receiving image 502 and trimap 503 and extracting patches 505 and 506 may be similar to process 300 in FIG. 3. Unlike process 300, however, for each image patch extracted, such as image patch 502, a subset of additional patches are sampled to predict alpha values for the query image patch 502. For example, image patches 505a, 505b, and 505c may be designated as context image patches for query image patch 502, and corresponding trimap patches 507a, 507b, and 507c may be designated as context trimap patches.

These context patches 505a-505c may be patches that would still otherwise be extracted, but, in addition to be being used to predict alpha values within the particular patch, they are used to provide context for predicting alpha values in another patch. Context image patches 505a-505c may be randomly selected for query image patch 502. In exemplary embodiments, context image patches are randomly selected only to the extent that the associated trimap for each context image patch includes known foreground regions and/or known background regions. In other words, any image patch/trimap patch pair selected for context includes known background and/or foreground information. In some embodiments, each context patch includes both known foreground and known background regions. Additionally, as depicted in FIG. 5, context image patches may be adjacent query image patch 506 within the larger image 502 (e.g., 505a and 505b) or may be spaced apart from query image patch 506 (e.g., 505c). Additionally, in example embodiments, the quantity of context patches ranges from 1 to 7. In the embodiment show in FIG. 5, for instance, three context patches are used to make predictions for a query patch. In some embodiments, the number of context patches may be dependent on the resolution of the input image. For instance, a greater number of context patches may be utilized for images of higher resolutions. It is contemplated that, in some embodiments, the same patches are utilized as context patches for multiple query patches. For instance, context image patches 505a-505c may be utilized to provide context for one or more other query image patches extracted from image 502.

Image patch 506 and trimap patch 508 are fed into a neural network system 520 along with context image patches 505a-505c and context trimap patches 507a-507c. Neural network system 520, which may be an embodiment of neural network system 214 of FIG. 2, includes an encoder 522, a within-patch attention module 524, a cross-patch attention module 526, and a decoder 528. Encoder 522 forms a first subset of layers within neural network system 520 and is generally responsible for transforming query image patch 306 and context image patches 505a-505c into feature maps. For each image/trimap pair (including both query patches and context patches), within-patch attention module 524 constructs correlations between features in different regions (e.g., known foreground, known background, and unknown) within a given patch. As such, within-patch attention module 524 outputs masked feature maps for each image patch/trimap patch pairs. Encoder 522 may be an embodiment of encoder 322 in FIG. 3 while within-patch attention module 524 may be an embodiment of within-patch attention module 324 of FIG. 3.

Unlike process 300 in FIG. 3, process 500 includes feeding the feature maps from within-patch attention module 524 into cross-patch attention module 526. Cross-patch attention module 526 is generally responsible determining correlations between features across different patches, such as a query image patch 506 and each context image patch 505a-505c. The correlations may be determined by obtaining value features and key features of the query image patch 506 and context image patches 505a-505c. Generally, key features for query and context patches are computed to determine where to retrieve relevant value features.

As such, in exemplary embodiments, for query image patch 506, feature maps generated by within-patch attention module 524 for query image patch 506 and context image patch 505a-505c are fed into cross-patch attention module 526. The encoded feature map for query image patch 506 is represented as $Q \in \mathbb{R}^{H \times W \times N}$, and the encoded feature map for a context image patch, such as context image patch 505a as an example, may be represented as $C \in \mathbb{R}^{K \times H \times W \times N}$, where K denotes the quantity of context patches.

In exemplary embodiments, each feature map is passed to two convolutional branches to obtain a value feature and key feature. In some embodiments, the value and key features are defined as follows, where K here denotes batch size in convolutional operations: query key is $K_Q \in \mathbb{R}^{H \times W \times N/8}$; query value is $V_Q \in \mathbb{R}^{H \times W \times N/2}$, context key is $K_C \in \mathbb{R}^{H \times W \times N/8}$, and context value is $V_C \in \mathbb{R}^{H \times W \times N/2}$. As indicted, the key feature map channel is reduced to N/8 and the value feature map channel is reduced to N/2. Reducing the channel number reduces computational costs.

Utilizing the value and key features, cross-patch attention may be performed to correlate features in the query image patch 506 and the context image patches 505a-505c. Cross-patch attention may be performed in accordance with the following:

$$y_i = \frac{1}{Z} \sum_j f(K_{Q,i}, K_{C,j}) g(V_{C,j})$$

$$f(K_{Q,i}, K_{C,j}) = \theta(K_{Q,i})^T \phi(K_{C,j})$$

Figure 6:
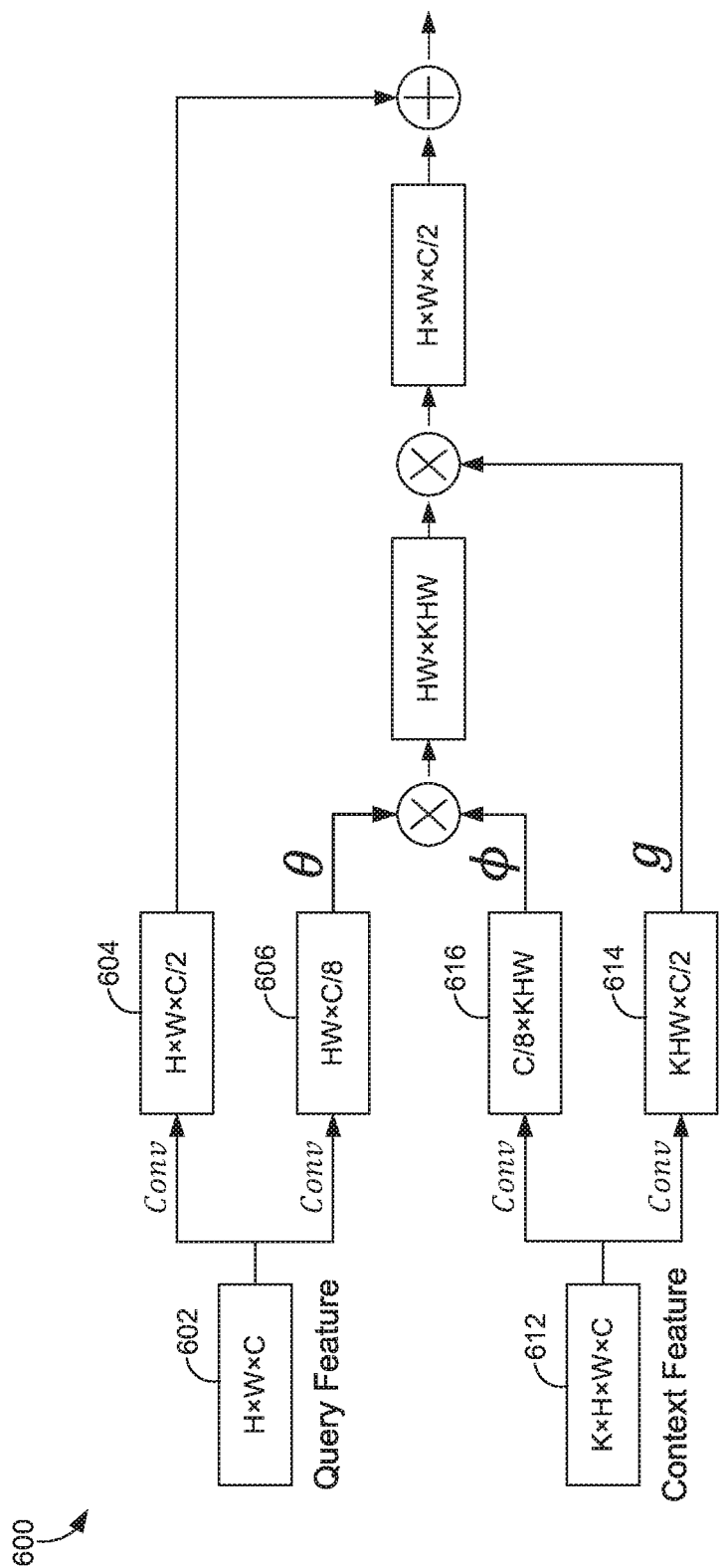
FIG. 6 illustrates an example pipeline for cross-patch attention, in accordance with embodiments of the present disclosure.

FIG. 6 depicts an example pipeline 600 for cross-patch attention module 526. Query feature map 602 is split into two branches representing query value 604 and query key 606, while each context feature map 612 is split into two branches representing context value 614 and context key 616. The query value 604, query key 606, context value 614, and context key 616 may then be forwarded to an attention module as defined above.

Returning to FIG. 5, the feature maps output from cross-patch attention module 526 are then fed through decoder 528, representing a final subset of layers in neural network system 520. Decoder 528 predicts alpha values for each pixel within query image patch 506 and may be similar to decoder 326 in FIG. 3. Alpha values for all pixels within image patch 506 are combined to generate a matte patch 530 that is output from the neural network system 520. This process may be performed for all image patches extracted from image 502, including patches used as context patches 505a-505c, and all resulting matte patches may be stitched to generate an overall matte 532 for the entire image 502 similar to the patch stitching process discussed with respect to FIG. 3.

Figure 7:
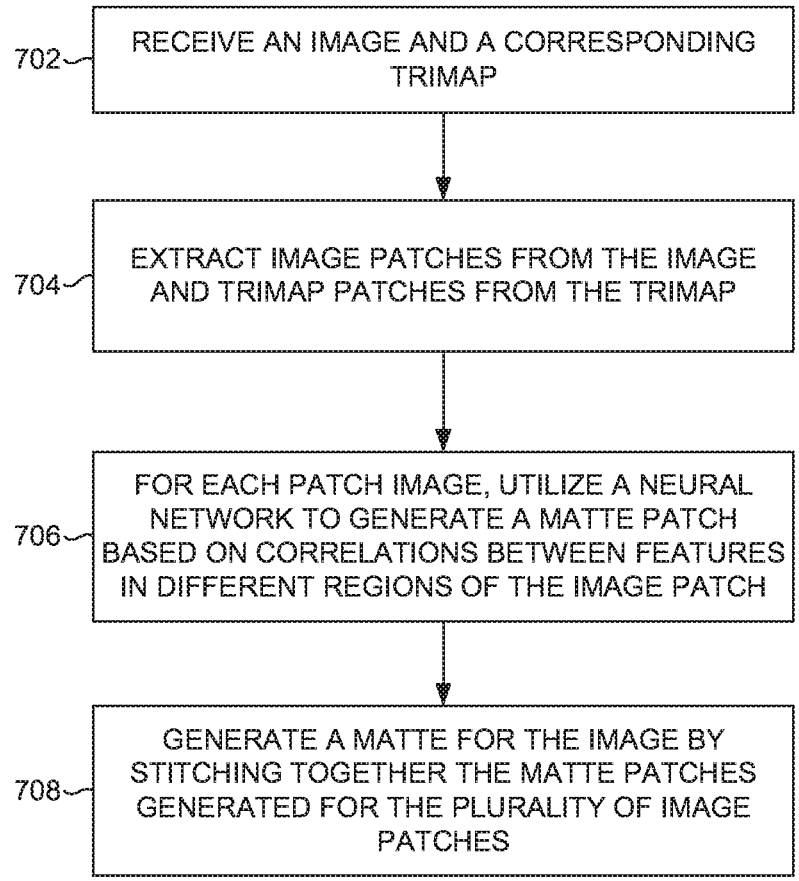
FIG. 7 illustrates an example method for generating mattes from input images, in accordance with embodiments of the present invention.

With reference to FIG. 7, a flow diagram is provided to show an embodiment of a method 700 for generating an image matte utilizing contextual information, in accordance with embodiments of the present invention. Method 700 may be performed, for example, by matting engine 210 of image matting manager 202 in FIG. 2. Further, embodiments of method 700 may be performed in accordance with process 300 of FIG. 3. Method 700 and other methods disclosed herein may be performed by various modules as indicated below. In some embodiments, some or all of these modules correspond to different functions performed by the same hardware components, such as the same processor on a computing device, which may be a user device or a remote server. Additionally or alternatively, some or all of these modules correspond to different hardware components, such as different processors on the same or different computing devices.

As such, at block 702, an image and a trimap corresponding to the image are received. Block 702 may be performed by a receiving module. The image may be received from a user at a user device. In particular, a user can select or input an image or picture for the image. In some aspects, the image is input by a user taking a picture using a camera on a device, such as user device 102a of FIG. 1. In other aspects, the image is selected by a user from a repository, for example, stored in a data store, such as database 112, accessible by a network or stored locally at the user device. An image may also be received by a user inputting a link or URL to the image. The trimap may be similarly received in different manners. For example, in some embodiments, the trimap for an image is created by a user manually selecting and identifying different regions of the image. Alternatively, the trimap can be generated automatically using an algorithm without user input.

At block 704, image patches are extracted from the image while trimap patches are extracted from the trimap. Block 704 may be performed by a patch module. Each trimap patch corresponds to an image patch such that a particular image patch and trimap are extracted from corresponding portions of the image and trimap. In some embodiments, the crop size of each patch is the same for all patches extracted from a particular image, but it is contemplated that different crop sizes for patches may be utilized for the same image. In example embodiments, extracting image patches includes extracting patches so that they partially overlap with at least one adjacent patch within the image. Trimap patches may similarly be extracted to partially overlap with at least one adjacent trimap patch.

At block 706, a neural network is utilized to generate a matte patch for each image patch. Block 706 may be performed by a matting module. In exemplary embodiments, the neural network utilized is an embodiment of neural network system 320 in FIG. 3. As such, generating the matte patch utilizing the neural network includes determining correlations between features in different regions of the image patch. This process may be done by first encoding the image patch into feature maps. Feature maps may then be utilized to construct correlations between features in different regions within a given patch, as indicated by the corresponding trimap patch. For instance, in exemplary embodiments, correlations are determined between features in unknown and foreground regions, unknown and background regions, and unknown and unknown regions. These correlations may be determined by a within-patch attention mechanism discussed with respect to within-patch attention module 324 in FIG. 3.

In some aspects, the output of within-patch attention includes masked feature maps that are utilized to predict alpha values for each pixel within the image patch. In exemplary aspects, predicted alpha values range from 0 to 1 and indicate a degree of opacity of the foreground color. Predicted alpha values for all pixels within the image patch are combined to generate the matte patch. The matte patch corresponds to the image patch in that the matte patch indicates background and foreground information for the image patch. This process may be performed for all image patches extracted from an input image to generate a plurality of matte patches.

At block 708, a matte for the entire image is generated. Generating the overall matte is done by combining the separate matte patches, which may include stitching together the matte patches. As such, block 708 may be performed by a stitching module. In some embodiments, the matte patches include some overlap, and stitching together the matte patches includes determining alpha values for pixels within the overlapping regions. The alpha value for a pixel in an overlapping region may be the weighted sum of the alpha values of pixels in the overlapping region, where each weight for an alpha value of a pixel in the overlapping region is negatively proportional to the distance of the pixel from the nearest non-overlapping pixel.

In some embodiments, method 700 further includes a step for extracting an object from the image utilizing the matte generated. Extracting an object utilizing the matte may be performed by an extracting module. The object to be extracted is identified as at least part of the foreground in the matte. As such, extracting the object may include removing pixels in the image that correspond to foreground in the generated matte. Extracting the object may be done with the matte automatically or with user input. Further, in some embodiments, method 700 includes compositing the extracted object with a different background image, which may be selected by the user. This step may be performed by a compositing module.

Method 700 may further include providing the output by the neural network system, such as a generated matte or an extracted foreground object, to a user device, such as, for example user device 102*a* depicted in FIG. 1. This step may be performed by an output module. In embodiments, this output can be manipulated and/or interacted with by the user, for example, by selecting a new background onto which to place the extracted object. Interaction with the extracted object can occur using techniques for placement on a new background including placement using a touch screen, a stylus, a mouse, and/or a track pad.

Figure 8:
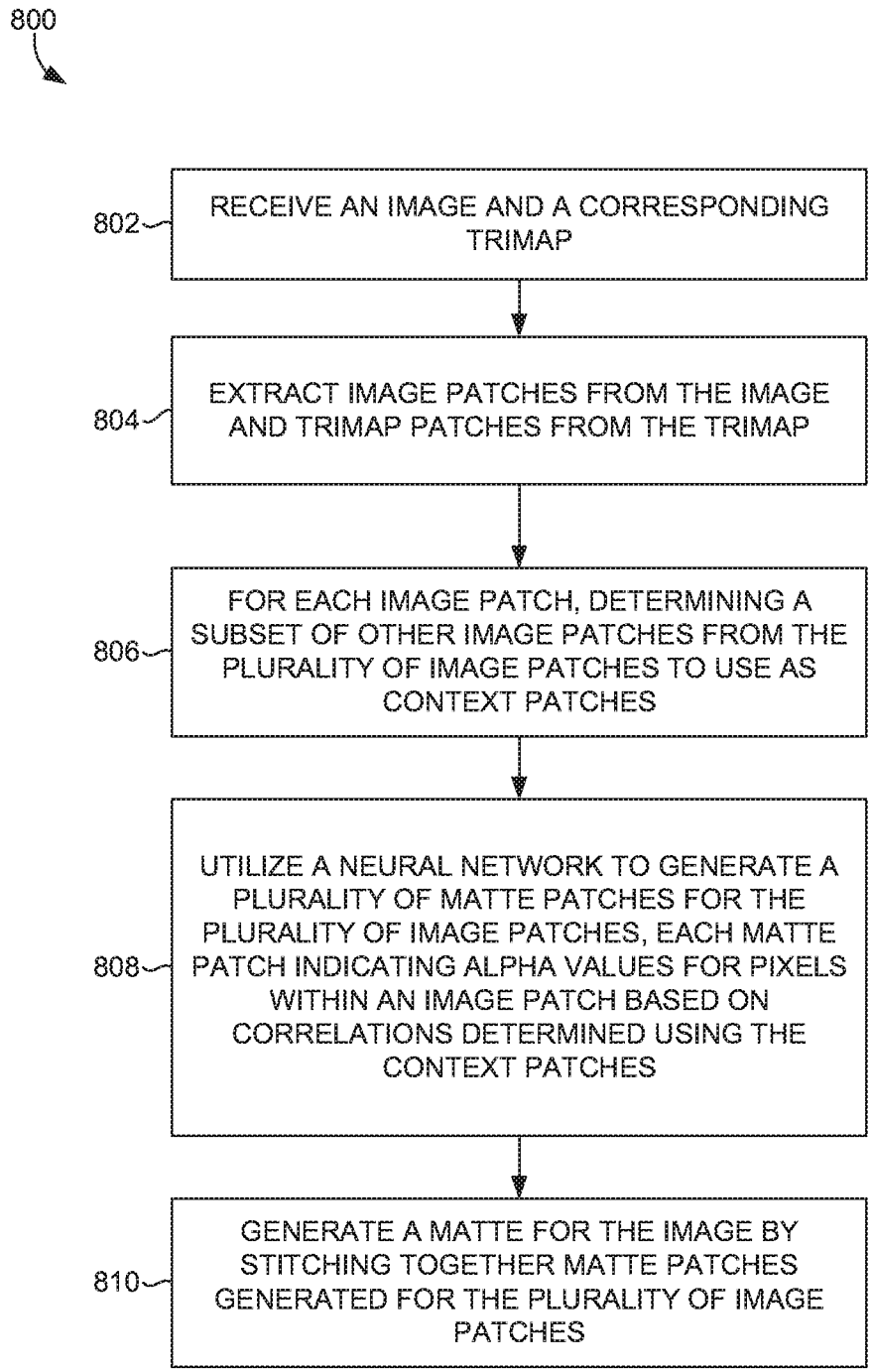
FIG. 8 illustrates an example method for generating mattes from input images, in accordance with embodiments of the present invention.

With reference to FIG. 8, a flow diagram is provided to show an embodiment of method 800 for generating an image matte utilizing contextual information from other patches, in accordance with embodiments of the present invention. Method 800 may be performed, for example, by matting engine 210 of image matting manager 202 in FIG. 2. Further, embodiments of method 800 may be performed in accordance with process 500 in FIG. 5.

As such, at block 802, an image and a trimap associated with the image are received. Block 802 may be performed by a receiving module. At block 804, image patches are extracted from the image, while trimap patches are extracted from the trimap. Block 804 may be performed by a patch module. Each trimap patch corresponds to an image patch. Embodiments of blocks 802 and 804 may be performed similarly to blocks 702 and 704, respectively, discussed with respect to FIG. 7.

At block 806, context patches are determined for each image patch. Block 806 may be performed by the patch module. The context patches are selected from the plurality of image patches extracted from the image. As such, for each image patch (referred to as a query image patch), a subset of additional image patches are determined to be used as context patches for the query image patch. In exemplary aspects, the context image patches are randomly selected for the query image patch to the extent that the associated trimap for each context image patch includes known foreground regions and/or known background regions. In some embodiments, each context patch includes both known foreground and known background regions. Context image patches may be adjacent the query image patch within the image or may be spaced apart from the query image patch. In exemplary embodiments, three context image patches are selected for each query image patch. Additionally, as each image patch is associated with a corresponding trimap patch, determining the subset of image patches to utilize as context patches includes selecting the trimap patches (which may be referred as context trimap patches) that correspond to the context image patches. In other words, determining the context image patches includes determining context image patch/trimap patch pairs.

At block 808, a neural network is utilized to generate matte patches for the image patches extracted from the image. Block 808 may be done by a matte module. In exemplary embodiments, the neural network utilized is an embodiment of neural network system 520 in FIG. 5. Generating the matte patch includes within-patch attention to determine correlations between features within a particular image patch and cross-patch attention to determine correlations between features in different patches. Determining correlations between features in different regions within an image patch may be performed as described with respect to block 706 in FIG. 7 and by an embodiment of within-patch attention module 324 in FIG. 3 or an embodiment of within-patch attention module 524 in FIG. 5. For each image patch, for instance, correlations may be determined between features in unknown and foreground regions, unknown and background regions, and unknown and unknown regions. In some embodiments, only correlations involving unknown regions are determined. Alternatively, the determined correlations may include a correlation between features in a foreground region and a background region, a correlation between features in a foreground region and a different foreground region, and/or a correlation between features in a background region and a different background region Based on features maps determined from correlations within regions of a query image patch and within regions of each corresponding context image patch, correlations between features in different image patches may be determined. This process may be performed by an embodiment of cross-patch attention module 526 in FIG. 5. For example, feature maps generated for the query image patch and the context image patches utilizing within-patch attention are utilized to obtain value features and key features. Generally, key features for the query image patch and context image patches are computed to determine where to retrieve relevant value features.

In some aspects, the output of cross-patch attention includes masked feature maps that are utilized to predict alpha values for each pixel within the query image patch. In exemplary aspects, predicted alpha values range from 0 to 1 and indicate a degree of opacity of the foreground color. Predicted alpha values for all pixels within the query image patch are combined to generate the matte patch that indicates background and foreground information for the query image patch. This process may be performed for all query image patches extracted from an input image to generate a plurality of matte patches.

At block 810, a matte for the entire image is generated by stitching together the matte patches that were generated for the individual query image patches extracted from the image. Block 810 may be performed by a stitching module. Generating the overall matte may be performed similarly to block 708 in FIG. 7. For example, in some embodiments, generating the matte for the image includes stitching together matte patches by determining alpha values for pixels within overlapping regions. Each predicted alpha values within an overlapping region may be the weighted sum of the alpha value of pixels in the overlapping region where weights in the overlapping region are negatively proportional to the distance from the nearest non-overlapping neighbor. In some embodiments, method 800 may include extracting an object within the image based on the generated matte as described with respect to method 700 in FIG. This step may be performed by an extracting module. Further, in some embodiments, method 800 includes compositing the extracted object with a different background image, which may be selected by the user. This step may be performed by a compositing module.

Method 800 may further include providing the output by the neural network system, such as a generated matte or an extracted foreground object, to a user device, such as, for example, user device 102*a* depicted in FIG. 1. This step may be performed by an output module. In embodiments, this output can be manipulated and/or interacted with by the user, for example, by selecting a new background onto which to place the extracted object. Interaction with the extracted object can occur using techniques for placement on a new background including placement using a touch screen, a stylus, a mouse, and/or a track pad.

Figure 9:
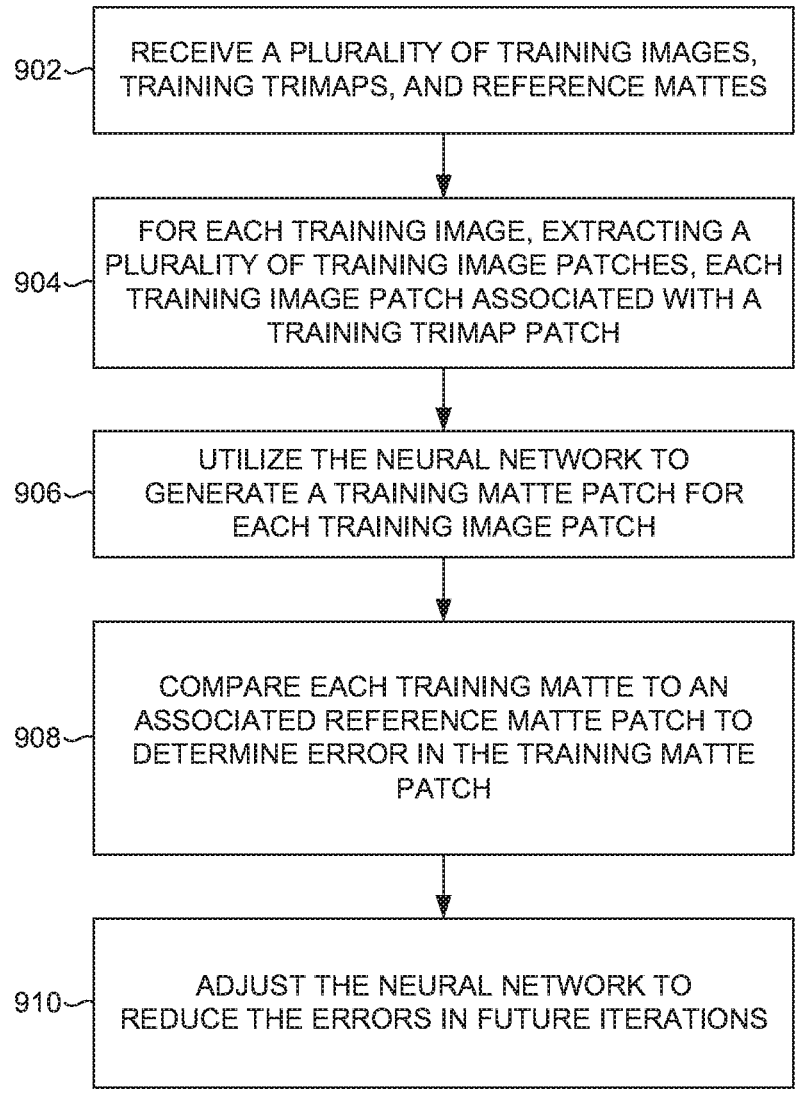
FIG. 9 illustrates an example method for training a neural network system to generate image mattes, in accordance with embodiments of the present invention.

With reference to FIG. 9, a flow diagram is provided to show an embodiment of method 900 for training a neural network system, such as neural network system 214 of FIG. 2, to generate image mattes based on contextual information. Method 900 may be performed, for example, by training engine 204 of FIG. 2.

As such, at block 902, training data is received, including training images, training trimaps, and reference mattes. Each training trimap corresponds to a training image, indicating regions of the corresponding training image that are known foreground, known background, and unknown. Additionally, each training image/trimap pair corresponds to a reference matte. Such training data can be received from, for example, training data 216 stored in data store 212 of FIG. 2 and/or from an image database stored in the cloud.

In some embodiments, synthetic training data is created and utilized to train the neural network system. Synthetic training images may be created by receiving foreground images that each have a finely annotated matte and fusing the foreground images with background images. A background image may be randomly selected for a foreground image. A training trimap may be created by randomly dilating the ground truth alpha matte for the foreground images.

At block 904, patches are extracted from the training data. For instance, training image patches are extracted from each training image, while training trimap patches are extracted from each training trimaps. Additionally, in exemplary embodiments, reference matte patches are extracted from each reference matte. Each patch is a portion of the respective larger data item. For instance, a training image patch is a portion of a training image. Each training image patch corresponds to a training trimap patch and a training reference patch. Extracting patches may be done as described with respect to block 702 of FIG. 7. In some embodiments, patches are extracted and stored prior to training the neural network such that method 900 includes receiving stored training image patches, training trimap patches, and training reference patches.

At block 906, a training matte patch is generated for each training image patch/trimap patch pair. In exemplary embodiments, generating the training matte patch is accomplished using a neural network system to predict alpha values for each pixel in a training image patch. Generating the training matte patch may be performed as described with respect to FIGS. 3-8. As such, the training matte patch is generated based at least on correlations between features within different regions of the training image patch.

Further, in some aspects, the training matte patch is generated also based on correlations between different patches. As such, in some embodiments, method 900 further includes determining a subset of training image patches to utilize as context image patches for each query image patch as discussed with respect to FIGS. 5 and 8. Additionally, correlations between features in a query image patch and the associated context image patches may be determined and utilized in generating the training matte patch for the query image patch as discussed with respect to FIGS. 5 and 8.

At block 908, each training matte patch is compared to the corresponding reference matte patch to determine errors in the training matte patch generated by the neural network. Errors can be determined, for example, using loss functions, such as pixel loss, compositional loss, or the like. Errors determined using loss functions may be used to minimize loss in the matting neural network. As such, in exemplary embodiments, comparing a training matte patch to a reference matte patch includes determining pixel loss, or the difference between predicted alpha values of the training matte patch and ground-truth alpha values of the reference matte patch. Based on the errors (e.g., determined loss function), at block 910, the neural network is adjusted to reduce errors in future iterations. In some embodiments, the loss function utilized to train the neural network is an average of alpha loss $\mathcal{L}_a$ and composite loss $\mathcal{L}_{comp}$. Alpha loss and composite loss may be determined as provided below where, in some embodiments, $\in = 1e^{-12}$.

$$\mathcal{L}_\alpha = \sqrt{\|\alpha_{gt} - \alpha_{pred.}\|^2 + \epsilon}$$

$$\mathcal{L}_{comp} = \sqrt{\|I_{comp} - (\alpha_{pred.} I_{fg} + (1 - \alpha_{pred.})I_{bg}\|^2 + \epsilon}$$

The determined errors may be utilized within an algorithm to improve the accuracy of the neural network. In exemplary embodiments, Adam optimization is utilized with the determined errors to adjust weights of the neural network system. The process of generating training matte patches, comparing output of the neural network system to reference matte patches, and adjusting the neural network system may be repeated for any number of iterations to train the neural network.

In some embodiments, errors of the neural network are determined based on a matte for a training image, as a whole, rather than by individual patches. As such, in some embodiments, prior to determining errors, the training matte patches generated for each training image patches extracted from a particular image are stitched together. The resulting training matte represents background and foreground information for an entire image, rather than only a patch. Then, the training matte is compared to a reference matte to determine errors in the training matte, and the neural network is adjusted to reduce errors in future iterations.

EXEMPLARY OPERATING ENVIRONMENT

Figure 10:
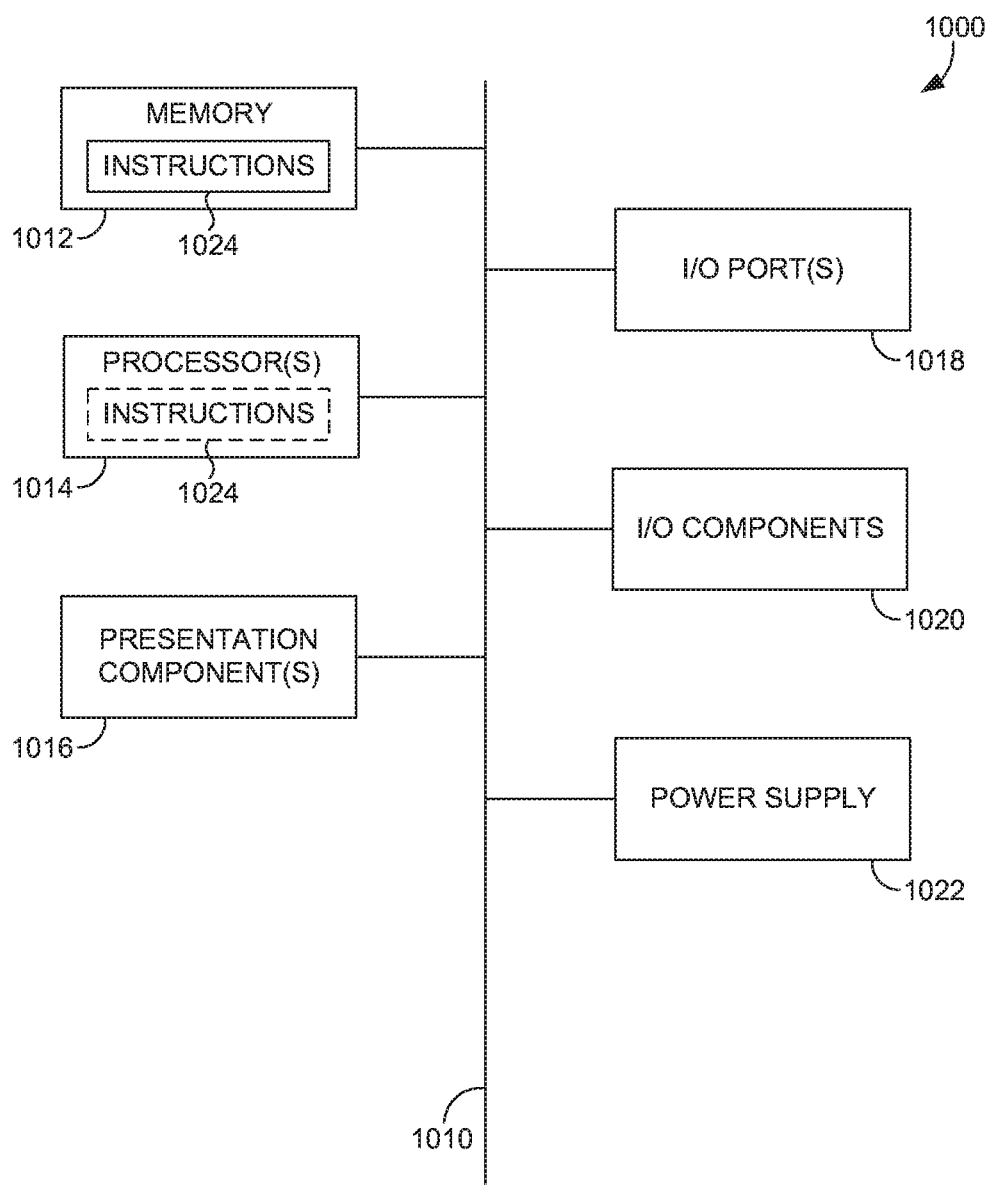
FIG. 10 is a block diagram of an example computing device in which embodiments of the present disclosure may be employed.

Having described embodiments of the present invention, FIG. 10 provides an example of a computing device in which embodiments of the present invention may be employed. Computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1000. Computing device 1000 may be equipped with depth cameras, such as stereoscopic camera systems, infrared camera systems, RGB camera systems, and combinations of these, for gesture detection and recognition. Additionally, computing device 1000 may be equipped with accelerometers or gyroscopes that enable detection of motion. The output of the accelerometers or gyroscopes may be provided to the display of computing device 1000 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. Mother instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computing system comprising:
   one or more processors; and
   one or more non-transitory computer-readable storage media, coupled with the one or more processors, having instructions stored thereon, which, when executed by the one or more processors, cause the computing system to provide:
      a means for training a neural network system, wherein the neural network system includes a neural network trained to generate mattes from images and corresponding trimaps, wherein the means for training the neural network system train the neural network system by:
         receiving training images, training trimaps, and reference mattes;
         for each training image, extracting a plurality of training image patches and a plurality of training trimap patches,
         utilizing the neural network, generating a training matte patch for each training image patch, each training matte patch indicating predicted alpha values for each pixel within the training image patch,
         for each training matte patch, comparing the training matte patch to a reference matte patch associated with a corresponding training image patch to determine an error, and
         adjusting the neural network to reduce the error; and
      a means for generating a matte for an image using the trained neural network system, the matte indicating alpha values predicted for pixels in a region of the image based on correlations between features in different regions within the image.

2. The computing system of claim 1, wherein the means for generating the matte for the image comprises:
   extracting a plurality of image patches from the image and a plurality of trimap patches from the trimap corresponding to the image;
   utilizing the trained neural network system to generate a plurality of matte patches, each matte patch indicating alpha values predicted for an image patch based on correlations between an unknown region, a foreground region, and a background region of the image patch; and
   stitching together the plurality of matte patches to create the matte for the image.

3. The computing system of claim 1, wherein the image is a high resolution image.

4. The computing system of claim 1, wherein generating a training matte patch for each training image patch comprises determining correlations between features in different regions of the training image patch and determining correlations between features in the training image patch and additional training image patches extracted from the training image.

5. A computerized method comprising:
   receiving training images, training trimaps, and reference mattes;
   for each training image, extracting a plurality of training image patches and a plurality of training trimap patches;
   utilizing a neural network to generate a training matte patch for each training image patch, each training matte patch generated indicating predicted alpha values for each pixel within the training image patch based on correlations between features in different regions of the training image patch, the different regions including an unknown region, a foreground region, and a background region determined from the training trimap patch corresponding to the training image patch;
   for each training matte patch, comparing the training matte patch to a reference matte patch associated with a corresponding training image patch to determine an error; and
   adjusting the neural network to reduce the error.

6. The computerized method of claim 5, wherein generating the training matte patch is further based on determining correlations between features in the training image patch and additional training image patches extracted from the training image from which the training image patch was extracted.

7. The computerized method of claim 6, wherein three additional training image patches are used to determine correlations between features in the training image patch and additional training image patches.

8. The computerized method of claim 6, wherein the additional training image patches each correspond to a training trimap patch that includes a background region and a foreground region.

9. The computerized method of claim 5, wherein the training images are high resolution images.

10. The computerized method of claim 5, wherein the operations further comprise: utilizing the neural network, once trained, to generate a matte for an image, the matte indicating alpha values predicted for pixels in a region of the image.

11. One or more non-transitory storage media having instructions embodied thereon that, when executed by one or more processors, perform operations comprising:
   receiving training images, training trimaps, and reference mattes;
   for each training image, extracting a plurality of training image patches and a plurality of training trimap patches;
   for each training image patch, selecting a subset of additional training image patches from training image patches extracted from the training image corresponding to the training image patch;
   utilizing a neural network to generate a training matte patch for each training image patch, each training matte patch generated indicating predicted alpha values for each pixel within the training image patch, the predicted alpha values determined using the subset of additional training image patches;

for each training matte patch, comparing the training matte patch to a reference matte patch associated with a corresponding training image patch to determine an error; and adjusting the neural network to reduce the error.

12. The one or more non-transitory computer storage media of claim 11, wherein the subset of additional training image patches comprises three training image patches.

13. The one or more non-transitory computer storage media of claim 11, wherein selecting the subset of additional training image patches comprises randomly selecting the subset of additional training image patches to the extent that each additional training image patch corresponds to a training trimap patch that includes a background region and a foreground region.

14. The one or more non-transitory computer storage media of claim 11, wherein alpha values for pixels within the training image patch are determined by:
   determining correlations between features in different regions of the training image patch, the different regions including an unknown region, a foreground region, and a background region; and
   determining correlations between features m the training image patch and the subset of additional training image patches.

15. The one or more non-transitory computer storage media of claim 11, wherein each training image patch is partially overlapping with at least one adjacent training image patch extracted from the same training image.

16. The one or more non-transitory computer storage media of claim 11, wherein the training images are high resolution images.

17. The one or more non-transitory computer storage medial of claim 11, wherein the operations further comprise:
   utilizing the neural network, once trained, to generate a matte for an image, the matte indicating alpha values predicted for pixels in a region of the image.

18. The computer system of claim 1, wherein the means for the means for training the neural network system further includes generating a matte further include, for each training image patch, selecting a subset of training image patches from the plurality of training image patches to utilize as context training image patches for the training image patch, wherein the alpha values for the training image patch are further based on correlations between features in the training image patch and the context training image patches.

19. The computer system of claim 18, wherein the subset of training image patches comprises three image patches.

* * * * *